US005716473A

United States Patent [19]
Gordon et al.

[11] Patent Number: 5,716,473
[45] Date of Patent: Feb. 10, 1998

[54] METHOD OF MAKING A SEMI-RIGID CEREAL CARTON

[75] Inventors: Robert L. Gordon, Monroe; Katherine A. Swenson, Goshen; David E. Stier, Middletown, all of N.Y.; Theresa A. Bronk, Cordova, Tenn.

[73] Assignee: International Paper, Purchase, N.Y.

[21] Appl. No.: 429,279

[22] Filed: Apr. 25, 1995

Related U.S. Application Data

[62] Division of Ser. No. 85,485, Jul. 2, 1993, Pat. No. 5,437,406.

[51] Int. Cl.[6] .............................. B65D 5/18; B32B 31/24

[52] U.S. Cl. .............................. 156/200; 53/458; 53/484; 53/491; 229/104; 229/115; 229/138; 229/193; 229/248; 383/90; 383/104; 383/120; 156/227; 156/465; 156/308.2; 156/308.4; 493/135; 493/151; 493/162

[58] Field of Search .............................. 156/200, 203, 156/465, 466, 227, 308.2, 308.4; 53/458, 484, 491; 493/135, 151, 162; 229/104, 115, 138, 193, 209, 246, 247, 248; 383/10, 90, 104, 120, 122, 906

[56] References Cited

U.S. PATENT DOCUMENTS

| | | | |
|---|---|---|---|
| 355,010 | 12/1886 | Farnsworth . | |
| 742,713 | 10/1903 | Morrison . | |
| 1,317,687 | 10/1919 | Cooper . | |
| 1,671,050 | 4/1928 | Snyder . | |
| 2,138,700 | 11/1938 | Hoff . | |
| 2,172,930 | 9/1939 | Bensel . | |
| 2,265,075 | 12/1941 | Knuetter | 156/203 |
| 2,377,533 | 6/1945 | Waters . | |
| 2,565,444 | 8/1951 | Waters | 156/465 |
| 2,575,544 | 11/1951 | Zinn, Jr. | 53/484 |
| 2,798,523 | 7/1957 | Barrett | 156/200 |
| 2,936,940 | 5/1960 | Berghgracht . | |
| 3,405,859 | 10/1968 | Phillips, Jr. | 229/108 |
| 4,020,988 | 5/1977 | Kipp . | |
| 4,102,484 | 7/1978 | Kipp . | |
| 4,200,219 | 4/1980 | Ramich . | |
| 4,974,966 | 12/1990 | Fabbi . | |
| 4,981,257 | 1/1991 | Radbruch . | |
| 5,356,069 | 10/1994 | Bochet et al. | 229/104 |

*Primary Examiner*—Michele K. Yoder
*Attorney, Agent, or Firm*—Michael J. Doyle

[57] ABSTRACT

A paperboard container of generally semi-rigid construction and formed from a unitary blank of paperboard folded in the general shape of a U. The interior surface of the container is coated with a thermoplastic polymer barrier layer, the container having a manually openable, normally closed pour spout at one upper edge portion, and also having a recessed or raised bottom. The container is particularly adapted for packaging granular, dry material such as corn flakes, pretzels, and the like. Due to its construction and the thermoplastic barrier layer, the usual inner pouch which contains dry cereal is omitted, thereby effecting savings in both material and in assembly of the final package. In one embodiment, an opening is provided for carrying the package, the opening located at the top of the container. In another embodiment one side wall of the panel is provided with an extension to serve as a reclosure flap.

4 Claims, 9 Drawing Sheets

METHOD OF MAKING A SEMI-RIGID CEREAL CARTON

This is a division of application Ser. No. 08/085,485 now U.S. Pat. No. 5,437,406 filed Jul. 2, 1993.

BACKGROUND OF THE INVENTION

This invention relates to a paperboard container particularly adapted to hold dry cereals, snacks, cake mixes, and similar foodstuffs.

In the packaging of dry cereals, such as corn flakes and the like, it is customary to employ an inner container of wax paper or an all plastic bag to hermetically enclose and contain the cereal. Then, the flexible inner container is placed within an outer container, the latter usually fashioned of paperboard and being in the shape of a rectangular parallelepiped being somewhat wider than it is thick. While satisfactory for the purpose of preserving the freshness of the product until opened by the consumer, such a construction requires the expense of two containers, namely, a flexible inner container for hermetic sealing to protect the product from ambient contamination and a paperboard outer container for package rigidity, as well as the assembly expense of placing one into the other.

SUMMARY OF THE INVENTION

According to the practice of this invention, the amount of packaging required to hold a product, such as corn flakes or the like, is reduced by the elimination of package components and by material changes. As will be apparent from the description to follow, the container of this invention is used to package any pourable, granular product such as cereal, sugar, flour, snacks, etc. This is accomplished by the elimination of the inner, flexible, plastic or wax paper container. Instead, the outer, semi-rigid container is fashioned from a unitary blank of paperboard coated on at least its interior forming surface with a thermoplastic barrier layer polymer. The paperboard thickness is typically in the range of 8, 10, or 12 points, depending on the size of and weight of the product. The container may be characterized as semi-rigid, with vertically extending side and end walls. The top edges of the two side walls are releasably sealed together. When assembled, there are no exposed paperboard edges. This construction, together with the thermoplastic polymer barrier coating on the interior surfaces of the container, yields packaged product protection until the container is opened by the consumer. In this respect, the container of this invention is equal to conventional two-piece containers for similar products, and also yields desired package rigidity.

DETAILED DESCRIPTION OF THE INVENTION

Figure 1:
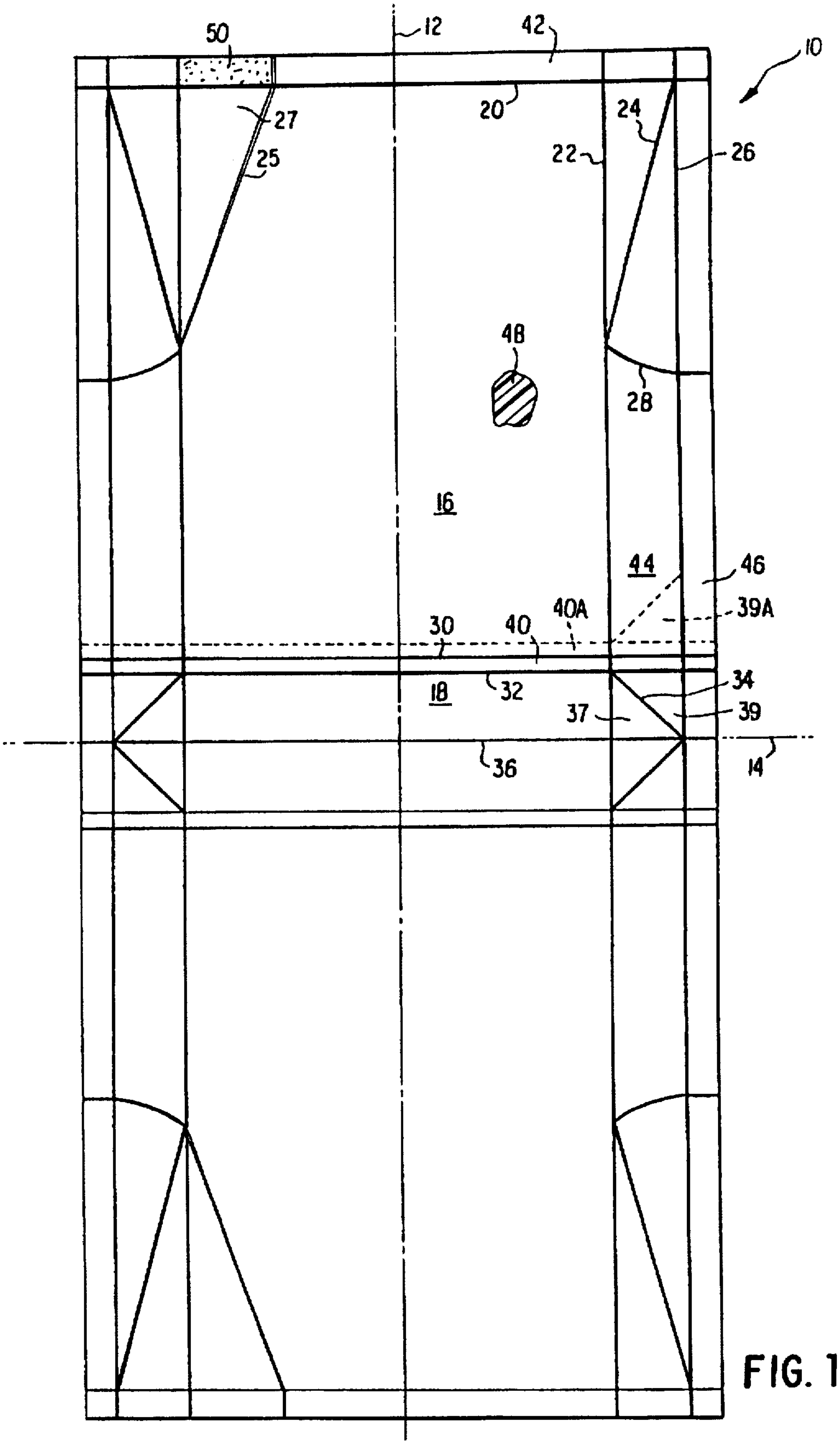
FIG. 1 is a plan view of a unitary blank of paperboard from which the semi-rigid container of this invention is formed. That surface of the blank which forms the interior surface of the container faces the reader.

Referring now to FIG. 1 of the drawings, a unitary paperboard blank that is developed from the web material is denoted generally as 10, the blank having a central vertical axis designated as 12 and a horizontal axis of mirror symmetry designated as 14. In view of the nature of the symmetry of the blank, only the upper right hand and upper left hand corners of the blank will be described with the aid of reference numerals. Each of two side wall forming panels of the semi-rigid container to be formed is designated as 16, with the bottom forming panel designated as 18. Score lines 20, 22, 24, 26, 28, 30, 32, 34, and 36 are designated by closely spaced double lines and are formed in the paperboard by methods and apparatus known in the paperboard packaging art. Zones 40, 42, 44, and 46 and defined by the score lines and the respective free edges of the blank which border them. Score line 25, slanting off of vertical score line 22, defines zone or area 27. A polymer barrier layer coating is denoted as 48, with such barrier coatings being common in the packaging art, for example, in milk cartons. In the construction of this invention the entire interior forming surface (facing the reader) of blank 10 is provided with such a coating. It will be understood that the entire inner surface of blank 10 is so coated, except for release coating 50 located along a portion of zone 42. Release coatings 50 are known in the packaging art. Zones 40A and 39A will later be described.

Figure 2:
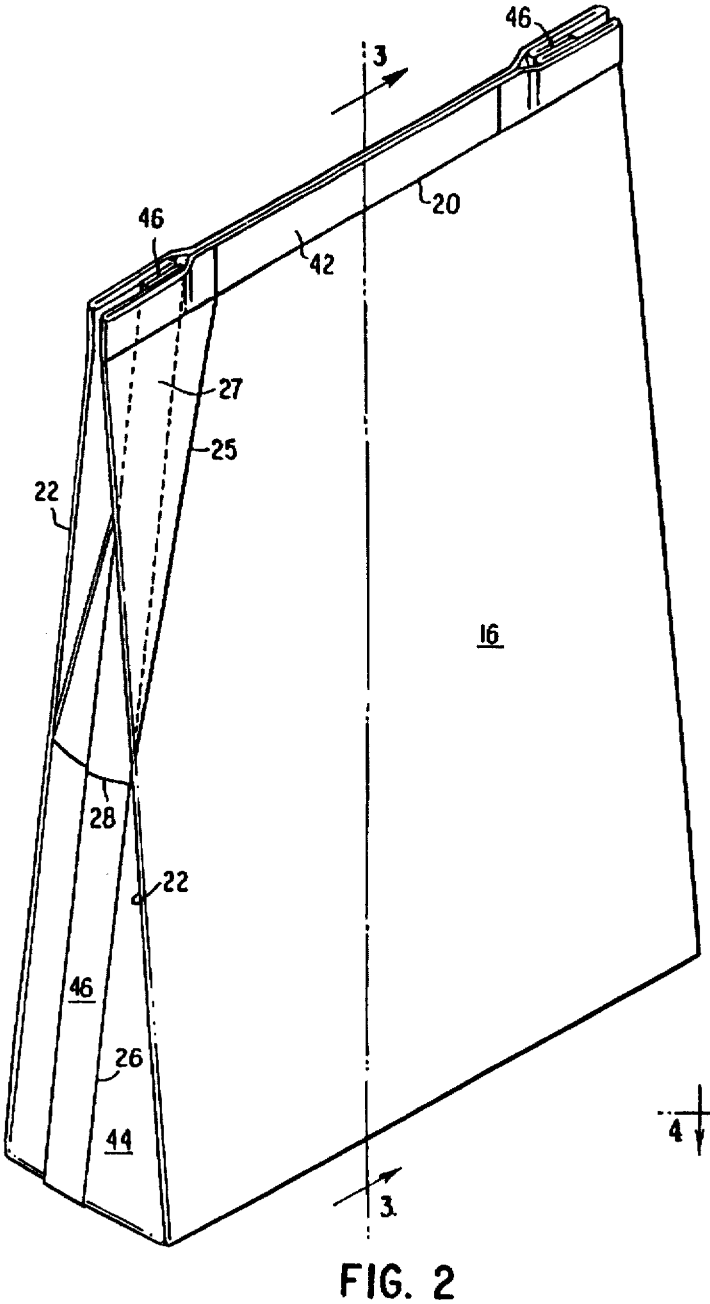
FIG. 2 is a perspective view showing the blank of FIG. 1 folded and heat sealed to form a container.
Figure 3:
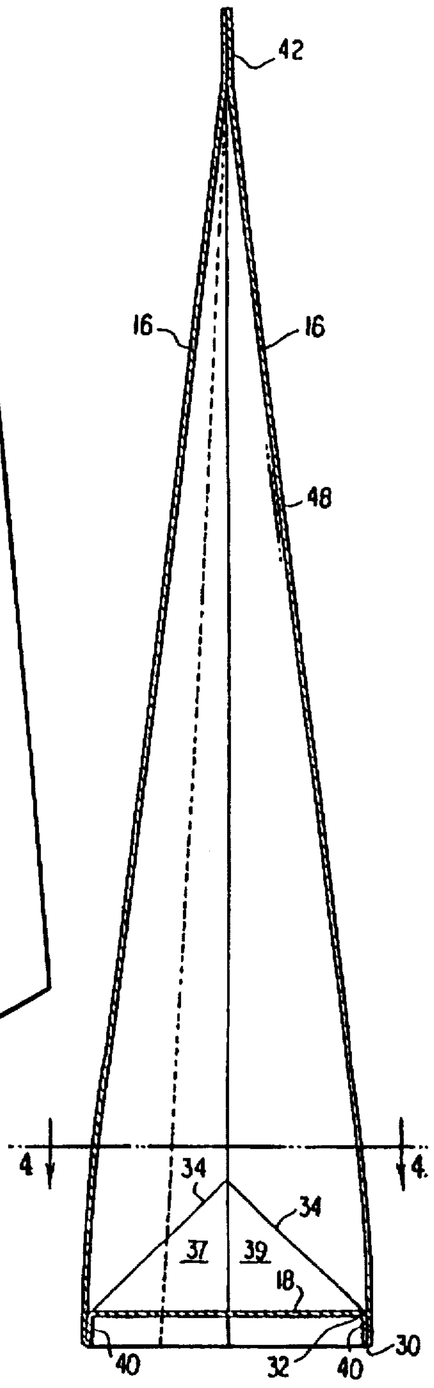
FIG. 3 is a view taken along section 3—3 of FIG. 2.

Referring now to FIGS. 2 and 3, blank 10 has been folded about score lines 30 and 32 and about score lines 34 and 36 to form the configuration shown at the bottom of FIG. 3.

Figure 4:
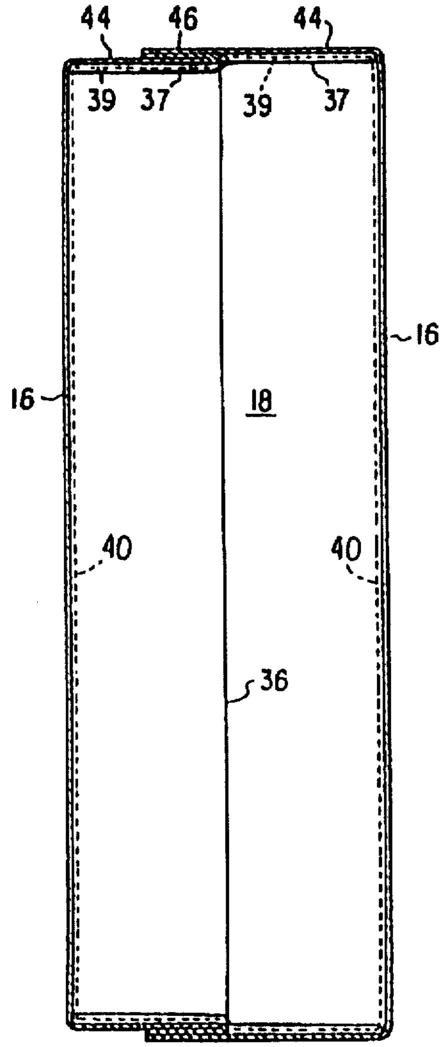
FIG. 4 is a view taken along section 4—4 of FIG. 3.
Figure 5:
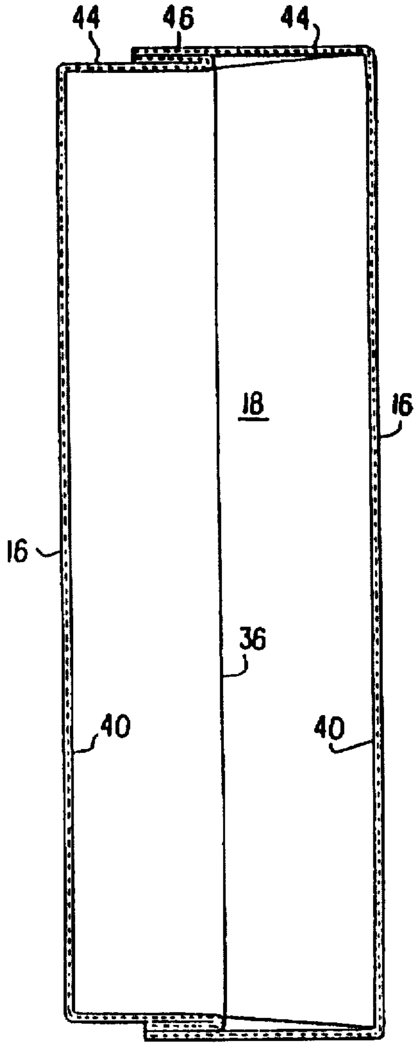
FIG. 5 is a bottom plan view of the container of FIG. 2.

Zones 40 have been sealed to the lower interior portions of side wall 16, denoted as 40A (see FIG. 1), by a combination of heat and pressure, with the thermoplastic polymer barrier coating 48 also serving, when subjected to heat and pressure, as a sealant or adhesive. Similarly, triangular gusset forming panels 39 and zones 39A are subjected to heat and pressure and sealed together in facing relation. FIG. 3 shows that the bottom 18 of the container is raised relative to the entire periphery of the lower edges of the container. Vertically running zones 46 of opposite edges are sealed together by heat and pressure to form a fin on each side of the container, and the lower fin sections rotated about their respective bases so as to lie generally flat against the lower portions of respective end walls. In order to adhere zones 46 to the end walls 44, a hot melt adhesive is applied to the underside of 46. This is seen at FIGS. 2, 4, and 5. The upper portions of the two container end walls are folded slightly inwardly along respective curved score lines 28. The upper portions of the end wall fins defined by sealed zones 46 are substantially perpendicular to the end walls and are sandwiched between the bent end portions of zones 42. Opposite zones 42 are sealed together by heat and pressure, as shown at FIG. 2. The heat and pressure may come from hot bars or hot air and then cooled to form a polymer bond.

FIGS. 4 and 5 are views of the bottom, with FIG. 4 looking down and FIG. 5 looking up.

Figure 6:
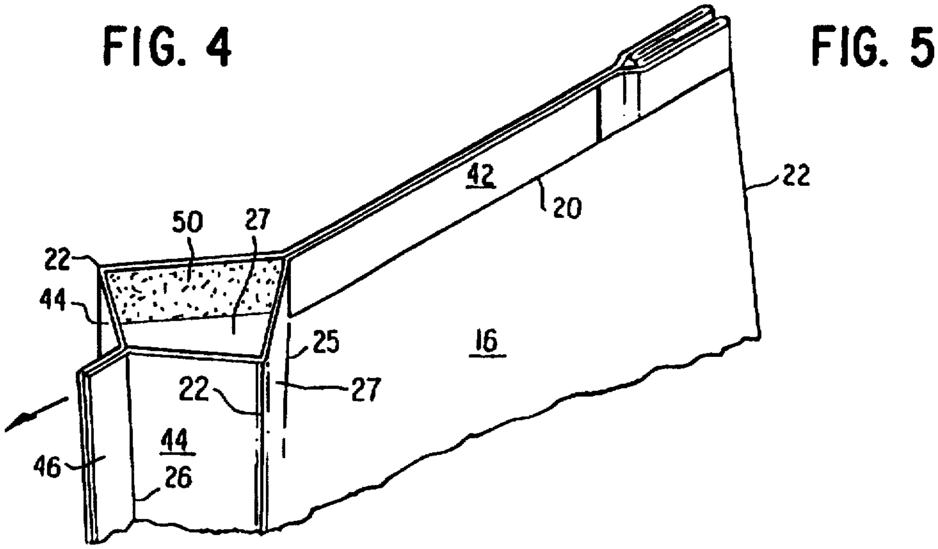
FIG. 6 is a view of the upper portion of FIG. 2 and illustrates how the container is opened to form a pour spout at one upper edge end.

FIG. 6 illustrates the formation of a pour spout at the upper left edge of the container of FIG. 2. The consumer pulls on the uppermost portion of the left hand fin defined by edge zones 46, as indicated by the arrow. The release coating 50 defines a weaker thermoplastic seal than the remainder of the heat and pressure sealed zones 42. This permits the spout forming action shown at FIG. 6. Score line 25, adjacent zone 27, facilitates the bending away of opposite zones 27 to permit spout side expansion as shown at FIG. 6. For reclosure, the resiliency of the paperboard permits a pushing of the fin of FIG. 6 in the opposite direction to the arrow.

Figure 7:
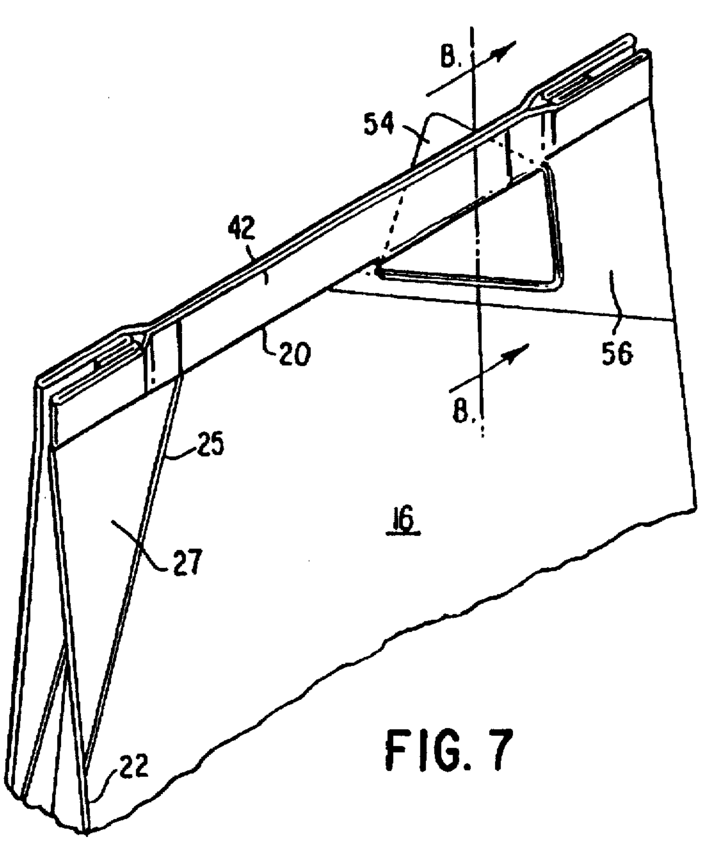
FIG. 7 is a view similar to the upper portion of FIG. 2 and illustrates an embodiment wherein a finger hole is provided at the top of the container for carrying it.
Figure 8:
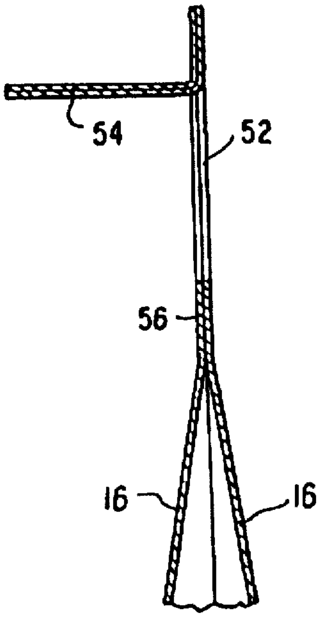
FIG. 8 is a view taken along section 8—8 of FIG. 7.

Referring now to FIG. 7 of the drawings, an embodiment is illustrated which is similar to that shown at FIG. 2, except for the additional provision of an opening for carrying the container and an additional seal area or zone. Openings 52 have been cut, as by die cutting, in the upper portions of side walls 16, with an integral flap 54 remaining with the paperboard. Flap 54 is of double thickness. A slanting heat and pressure seal zone 56 extends from approximately the central portion of the top of the container to a respective end wall and is generally triangular. As indicated at FIG. 8, the reader will by reference to FIG. 3 visualize that heat and pressure applied along zone 56 of FIG. 7 will yield a seal. The seal formed along zone 56, together with seal at zones 42 of the upper portion of the container, yield a complete seal for the container contents.

Figure 9:
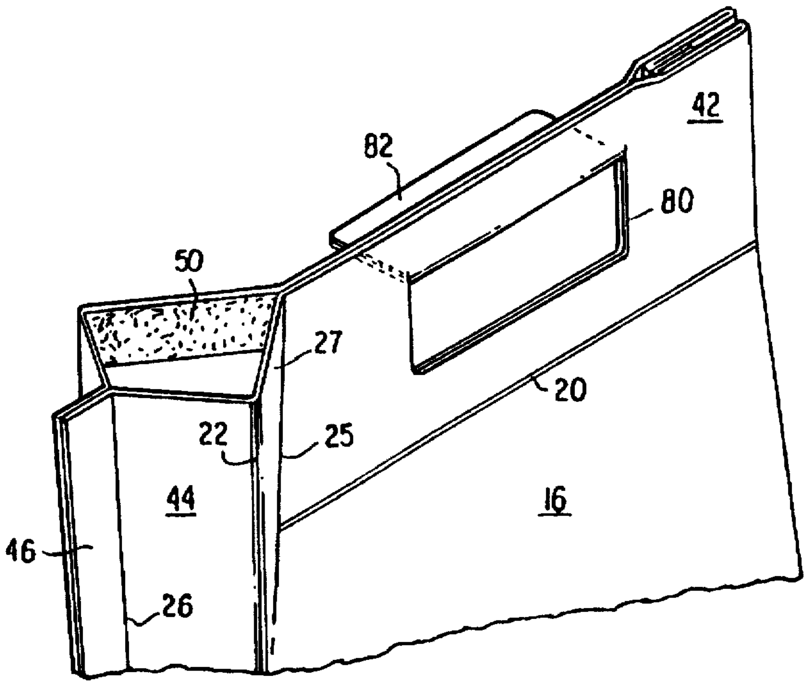
FIG. 9 is a view similar to FIG. 6 and illustrates another form of a finger opening at the top of the container.

FIG. 9 illustrates an embodiment similar to that shown at FIG. 2, except that fold lines 20 are spaced a greater distance from the top edges of the container, with a consequence that zone 42 is wider in the completed container. Further, openings 80 have been cut, typically as by die cutting, in both layers of the paperboard, and a flap 82, similar to flap 54 of FIG. 8, is formed. The mode of forming a pour spout in this embodiment is the same as that described at FIG. 6.

Figure 10:
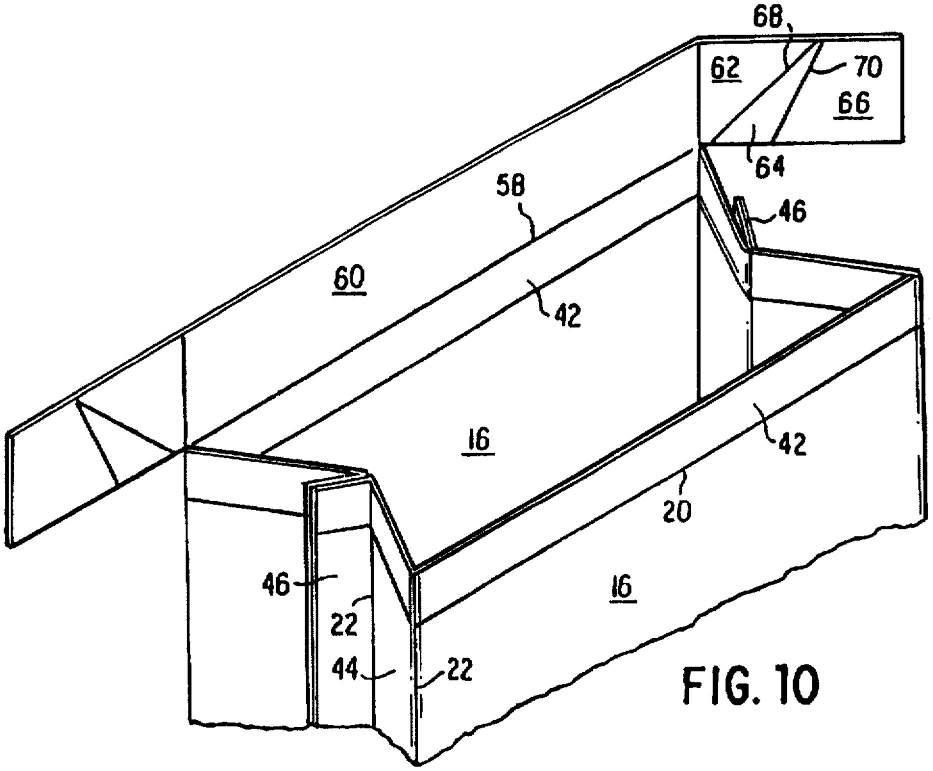
FIG. 10 is a perspective view at the upper portion of a carton similar to that of FIG. 2 and showing an alternative sealing and opening structure.
Figure 11:
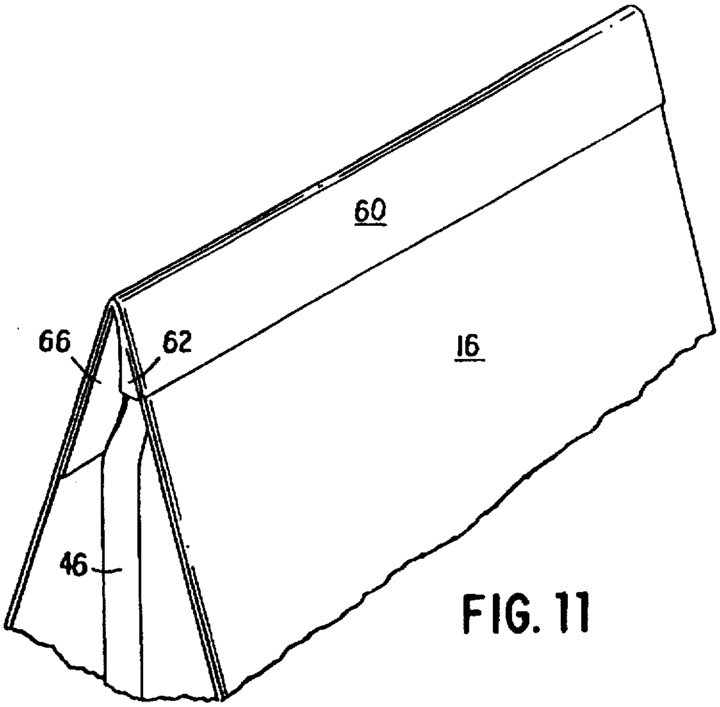
FIG. 11 is a view similar to FIG. 10 and illustrates the upper part of the container after it has been closed and sealed.
Figure 12:
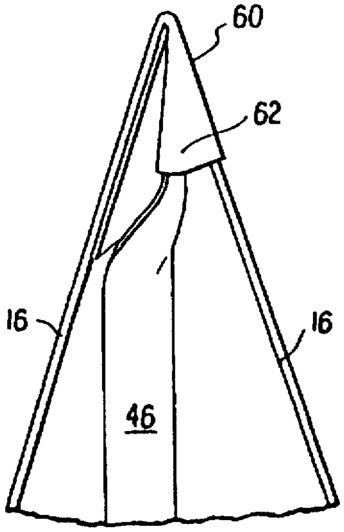
FIG. 12 is an end elevational view of the container portion of FIG. 11.

Referring now to FIGS. 10–12, another embodiment of this invention is illustrated, again fashioned from a unitary blank of paperboard, such as blank 10 of FIG. 1. The blank from which the container of FIGS. 10–12 is formed differs only from blank 10 of FIG. 1 in the absence of slanted, pour spout forming score lines 25, curved score lines 28, score lines 24, and the addition of main closure panel 60 integrally and foldably secured to the top of rear zone 42 of rear side wall 16. Each side edge of main panel 60 is integral with a respective side closure panel having zones or sections 62, 64, and 66 defined by score lines 68 and 70. After the container is filled, the two side walls 16 are sealed together by heat and pressure at their respective top zones 42, with main closure flap 60 and the two secondary closure flaps carried at the ends of the latter folded in the manner indicated at FIGS. 11 and 12. To effect initial opening of the container, each of the two end closure panels 62, 64, 66 is unfolded from the configuration shown at FIGS. 11 and 12, top closure flap 60 is bent backward, and the top of the container is opened by pulling the sides apart to break the seal at zones 42. A release coating similar to coating 50 of FIG. 6 is needed for a nondestructive seal opening. To effect reclosure after initial opening and partial dispensing of the contents, the container is pushed back as nearly as possible to the closed configuration, with top closure flap 60 and end closures 62, 64, 66 refolded to assume their original positions in the top edges of the container. Full opening of the top is needed for large, non pourable products such as snacks.

A description will now be given of a manner of forming the semi-rigid container of this invention using mass production methods. It will be understood that the individual steps to be described are carried out at known pressures and temperatures using either known apparatus or apparatus easily constructed by those skilled in this art.

Figure 13:
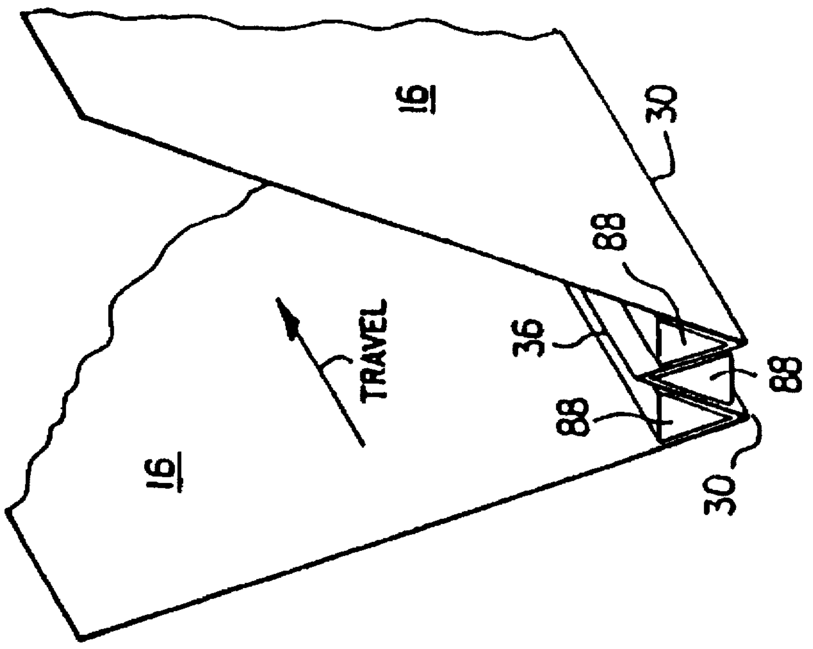
FIG. 13 is a partially schematic perspective view showing an initial step in forming the container of this invention on a mass production basis from a paperboard web of indefinite length.

Referring now to FIG. 13, a continuous paper web of indefinite length is folded to a generally U shape about score lines 30 and 36 so that the middle or bight portion of the web assumes the form of a W. The reader may visualize the continuous web of indefinite length as defined by an indefinite number of the blanks of FIG. 1 placed side by side and integral with each other. It will be understood that prior to the step shown at FIG. 13, the several score lines shown at FIG. 1, for each container forming span of the web, have already been formed and the thermoplastic polymer barrier layer 48 has been applied. Three plows each designed as 88 are placed in the indicated locations to form the W shape of the web mid portion.

Figure 15:
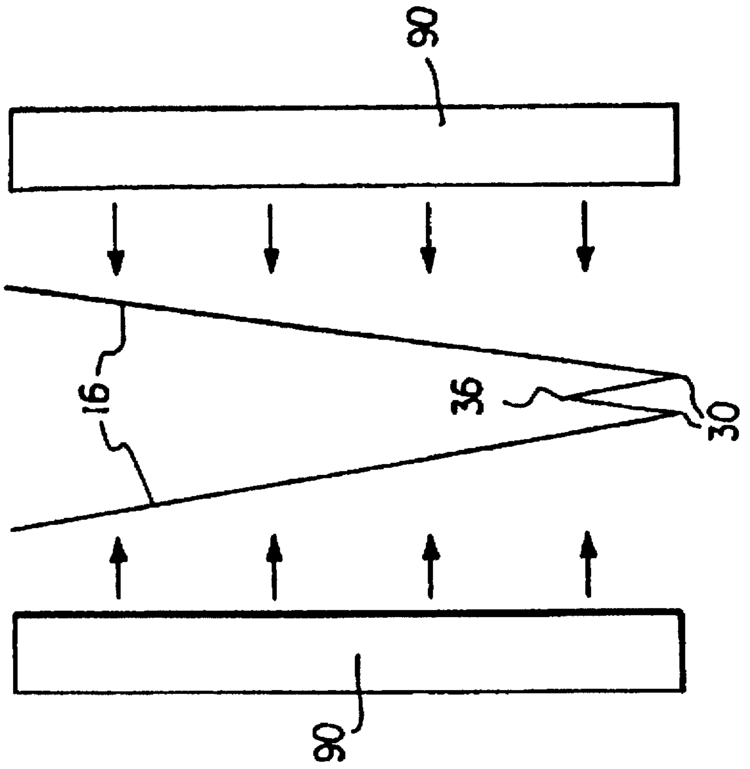
FIG. 15 is an end view, taken parallel to the web direction of travel, and illustrates how the seals shown by shading at FIG. 14 are formed.
Figure 14:
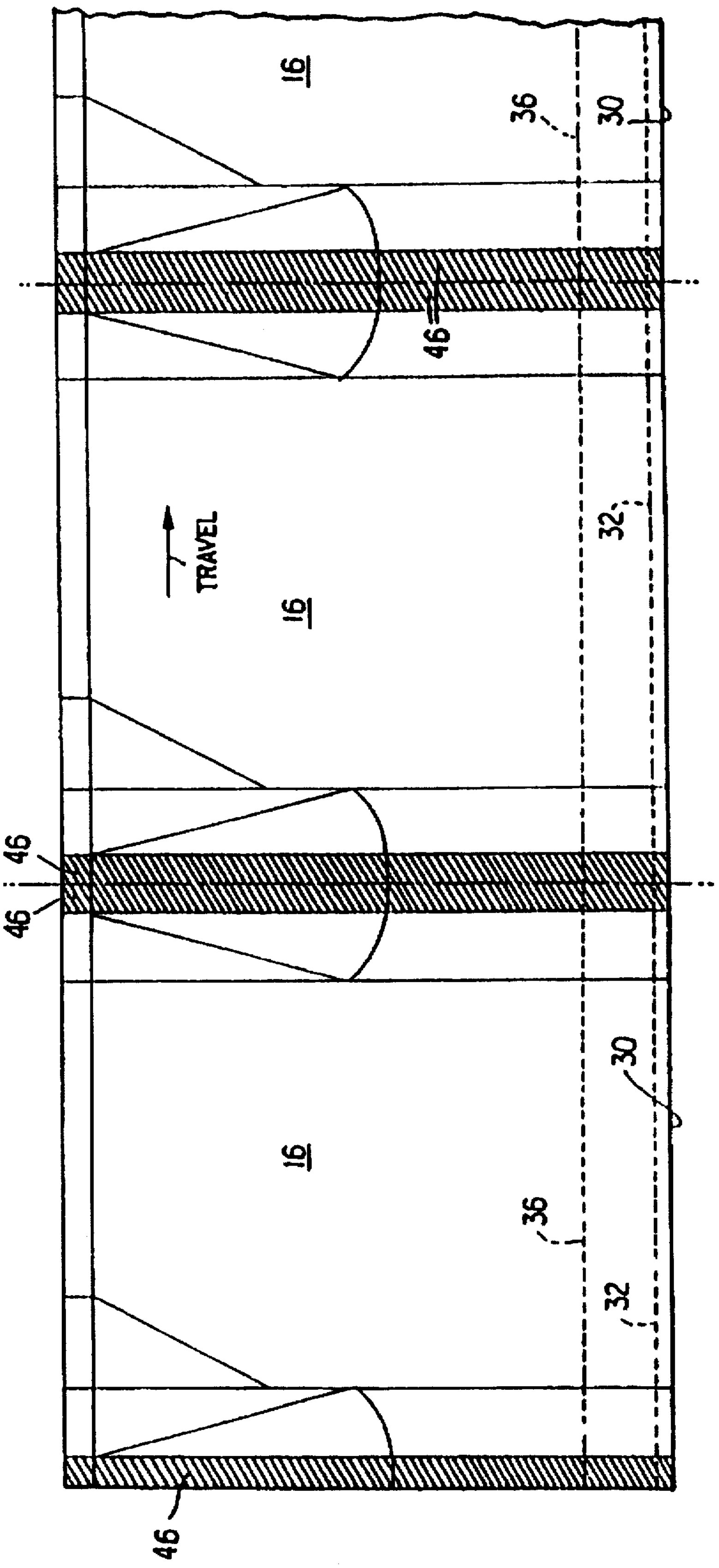
FIG. 14 is a view of the folded web of indefinite length shown at FIG. 13 in a later stage of container formation.

Referring now to FIGS. 14 and 15, plows 88 remain in place, while at a location downstream from plows 88 side forming panels 16 placed together in parallelism and touch each other. The top of the middle leg of the W coincides with score line 36, while the bottom W legs coincide with aligned score lines 30. Now, in sequence, a pair of oppositely directed heat sealing bars 90 are pressed against spaced portions of the U folded web to form double heat seal zones 46 of each of the U legs, as shown by the shaded areas, to define two adjoining seal zones 46.

Figure 16:
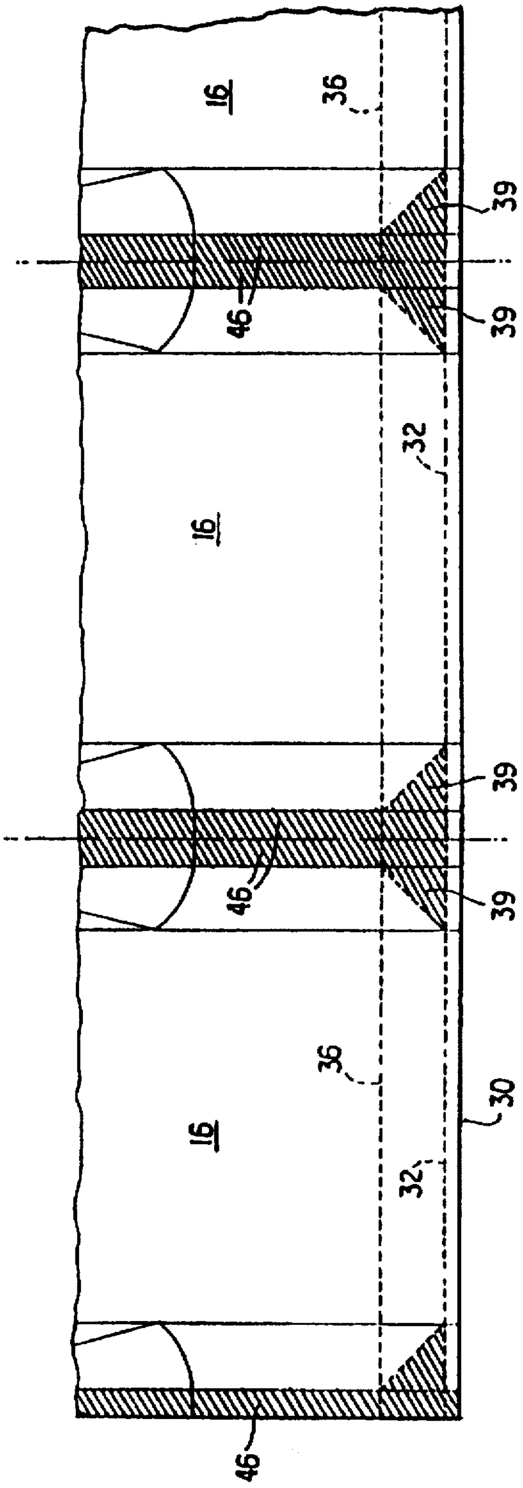
FIG. 16 is a view similar to FIG. 14 and illustrates gusset seal zones.
Figure 17:
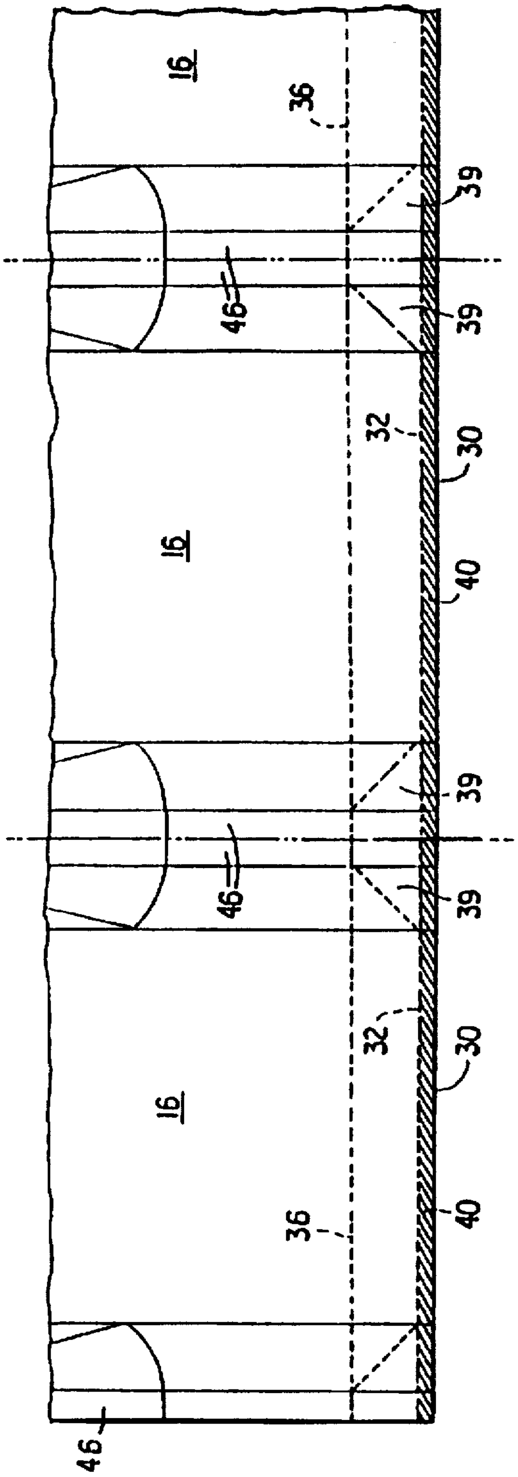
FIG. 17 is a view similar to FIG. 14 and illustrates lowermost edge seal zones.

Referring now to FIG. 16, after zones 46 have been heat sealed together, with the thermoplastic polymer barrier layer 48 serving as an adhesive sealant under the action of heat and pressure, each gusset zone 39 is heat sealed to its corresponding zone 39A by opposing heat seal bars (not shown) similar to bars 90. FIG. 1 shows that each triangular gusset area 39 is aligned, after folding, to an associated and respective area 39A.

Referring now to FIGS. 17 to 20, oppositely positioned heat seal bars 94 are pressed against the lower edge of the U folded web so that zone 40 of each container forming web segment is sealed to its respective portion 40A, the latter two zones shown at FIG. 1. For purposes of illustration of this step, the already sealed areas indicated by shading (zones 46 and 39) as FIG. 16 are not shown at FIG. 17.

Figure 18:
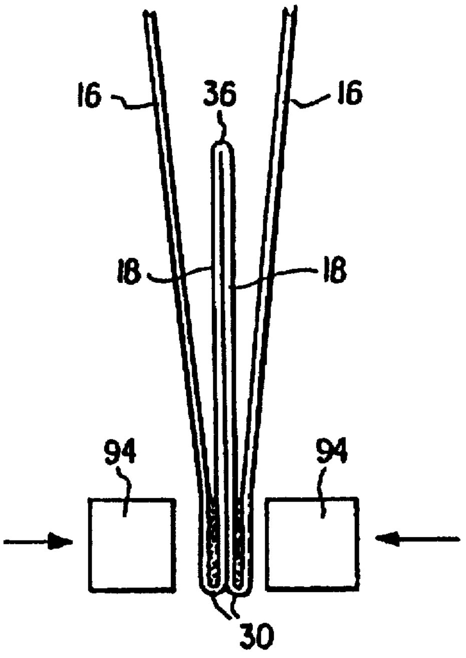
FIG. 18 is an end view, taken parallel to the web direction of travel, and illustrates how the lowermost seal zones of FIG. 17 are formed.
Figure 19:
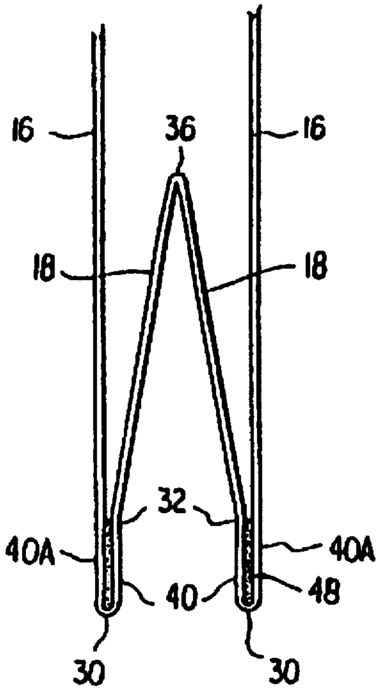
FIG. 19 is a view similar to FIG. 18 showing initial separation of the container side walls after formation of the lowermost seal zones.
Figure 20:
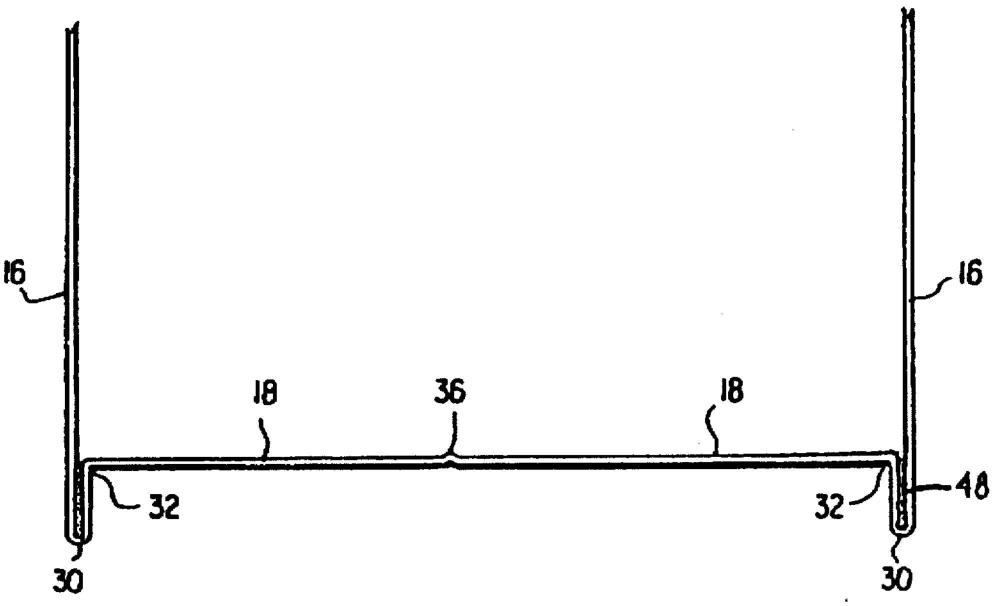
FIG. 20 is a view similar to FIG. 19 and shows final formation of the container side walls.

FIG. 19 illustrates the sealing of zones 40 and 40A for each lower leg of the W, with the thermoplastic polymer layer 48, shown by stippling at FIGS. 18 and 19, acting as an adhesive between these zones. FIG. 20 illustrates the final transverse cross section of the bottom of the semi-rigid container of this invention, the bottom having been flattened as by a mandrel, with the seal areas 40 and 40$a$ forming the slanted bottom of the container. Zones or surfaces 40 and 32 will not seal together under the action of heat and pressure since they do not have a polymeric material on them.

After the U web of paperboard, has been sealed along shaded areas 46 (FIGS. 14 and 15), and after zones 39 and 39A have been sealed together (FIG. 16), and after zones 40 and 40A have been sealed together (FIGS. 17 to 19), the U web is cut along the middle of the shaded areas 46 (FIGS. 14 and 16) to form individual containers. After opening each container from its flattened U shape to form the bottom configuration of FIG. 20, it is filled with product and then heat sealed along its top edge, as shown at FIG. 2. Seal zones 46, 39, 39A, 40, 40A may all be formed or sealed simultaneously, using a single pair of opposed heated elements, instead of separate steps using a plurality of opposed heated elements.

It will be understood that geometrical terms of orientation such as upper, lower, and the like have been used to facilitate the description and are not intended as terms of limitation. Further, the reference numerals which appear in some of the claims are to assist the reader to an understanding and are not intended as limiting.

We claim:

1. A method of mass producing a semi-rigid paperboard container, said method including the steps of:

(1) bending a paperboard web of indefinite length having a central longitudinal axis about its said central longitudinal axis to thereby define a U shaped web, said U shaped web having an inner surface which is coated with a thermoplastic polymer barrier layer, and moving said U shaped web in a direction parallel to said longitudinal axis, (2) engaging the bottom or bight portion of said generally U shaped web against a plurality of plows, to thereby impart a W shape to the bottom or bight portion of the U shaped web, (3) thereafter squeezing opposite sides of said generally bottom W shaped web together by means of opposite, parallel heated bars to form a plurality of transversely spaced and sealed together heat seal zones, said barrier coating functioning as an adhesive for said heat seal zones, (4) pressing lower portions of the legs of said bottom W shaped web together under the action of oppositely directed heat seal bars to form continuous seals between said legs along the longitudinal direction of said web, (5) cutting said web transversely along said transversely spaced heat seal zones substantially in the middle of said transversely spaced heat seal zones to thereby define a plurality of generally U shaped container blanks sealed together along their side edges but being open at their top edges.

2. The method of claim 1 including the additional step of, subsequent to step (3), (6) pressing triangular shaped heated bars, on opposite sides of said bottom W shaped web, against the web to form generally triangular shaped and spaced heat sealed areas, said thermoplastic barrier layer functioning as an adhesive for said heat sealed triangular areas.

3. The method of claim 1 including the steps of filling each container blank with product and then sealing said container blanks along their respective top edges together.

4. The method of claim 2 including the steps of filling each container blank with product and then sealing said container blanks along their respective top edges together.

* * * * *